(12) United States Patent
Ohshitanai

(10) Patent No.: US 11,025,852 B2
(45) Date of Patent: Jun. 1, 2021

(54) IMAGE CAPTURING APPARATUS AND CONTROL METHOD THEREOF

(71) Applicant: CANON KABUSHIKI KAISHA, Tokyo (JP)

(72) Inventor: Kazuki Ohshitanai, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/660,159

(22) Filed: Oct. 22, 2019

(65) Prior Publication Data

US 2020/0137338 A1 Apr. 30, 2020

(30) Foreign Application Priority Data

Oct. 25, 2018 (JP) .............................. JP2018-201158

(51) Int. Cl.
  *H04N 5/341* (2011.01)
  *H04N 5/378* (2011.01)
  *H04N 5/3745* (2011.01)

(52) U.S. Cl.
  CPC ............ *H04N 5/378* (2013.01); *H04N 5/341* (2013.01); *H04N 5/37455* (2013.01)

(58) Field of Classification Search
  CPC ...... H04N 5/341; H04N 5/345; H04N 5/3456; H04N 5/347; H04N 5/378; H03M 1/825
  USPC .......................................... 348/294, 300–302
  See application file for complete search history.

(56) References Cited

U.S. PATENT DOCUMENTS

| | | | | |
|---|---|---|---|---|
| 2013/0242125 A1* | 9/2013 | Yang | ..................... | H03M 1/007 348/222.1 |
| 2015/0350555 A1* | 12/2015 | Nishi | ................ | H01L 27/14621 348/333.02 |
| 2015/0357369 A1* | 12/2015 | Kobayashi | ............. | H04N 5/378 250/208.1 |
| 2018/0288316 A1* | 10/2018 | Shionoya | .............. | G06T 3/4015 |

FOREIGN PATENT DOCUMENTS

JP 2016-072863 A 5/2016

* cited by examiner

*Primary Examiner* — Anthony J Daniels
(74) *Attorney, Agent, or Firm* — Cowan, Liebowitz & Latman, P.C.

(57) ABSTRACT

An image capturing apparatus includes a pixel portion in which a plurality of pixel blocks are arranged, each pixel block including a predetermined number of pixels; a plurality of readout circuits arranged corresponding to the plurality of pixel blocks; a supply unit that supplies drive signals to the plurality of readout circuits; a setting unit that sets image capturing conditions for each of the plurality of pixel blocks; and a control unit that carries out control so that when the setting unit has set different image capturing conditions for a first pixel block and a second pixel block, the supply unit supplies a first drive signal to the readout circuits corresponding to the first pixel block, and supplies a second drive signal to the readout circuits corresponding to the second pixel block.

7 Claims, 11 Drawing Sheets

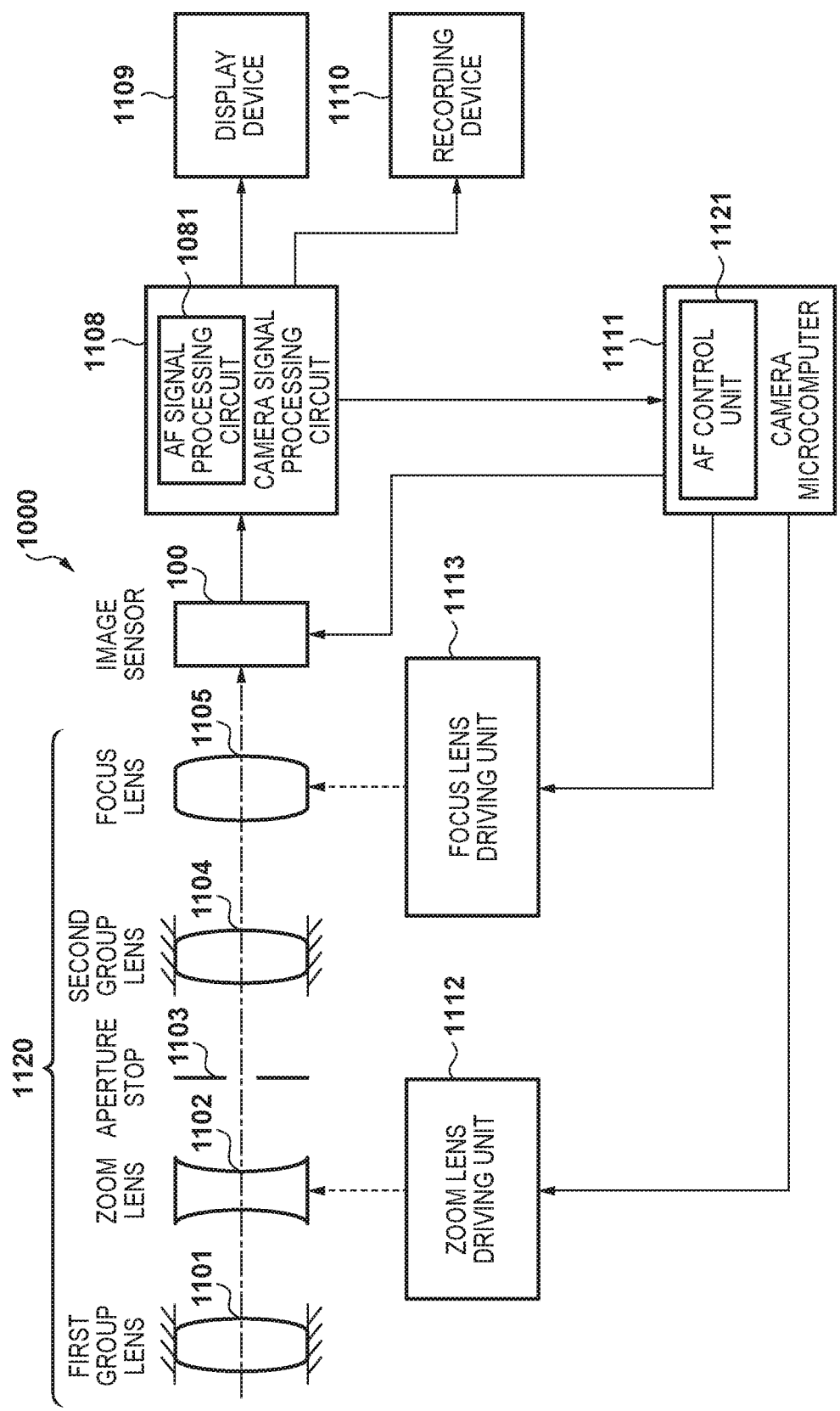

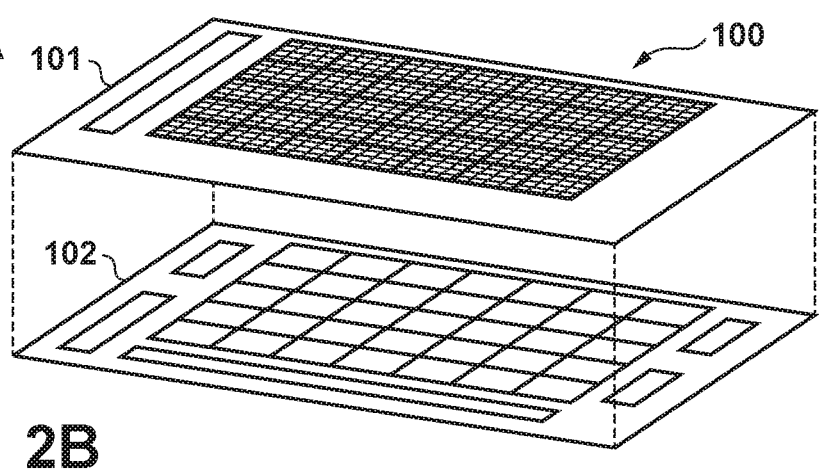
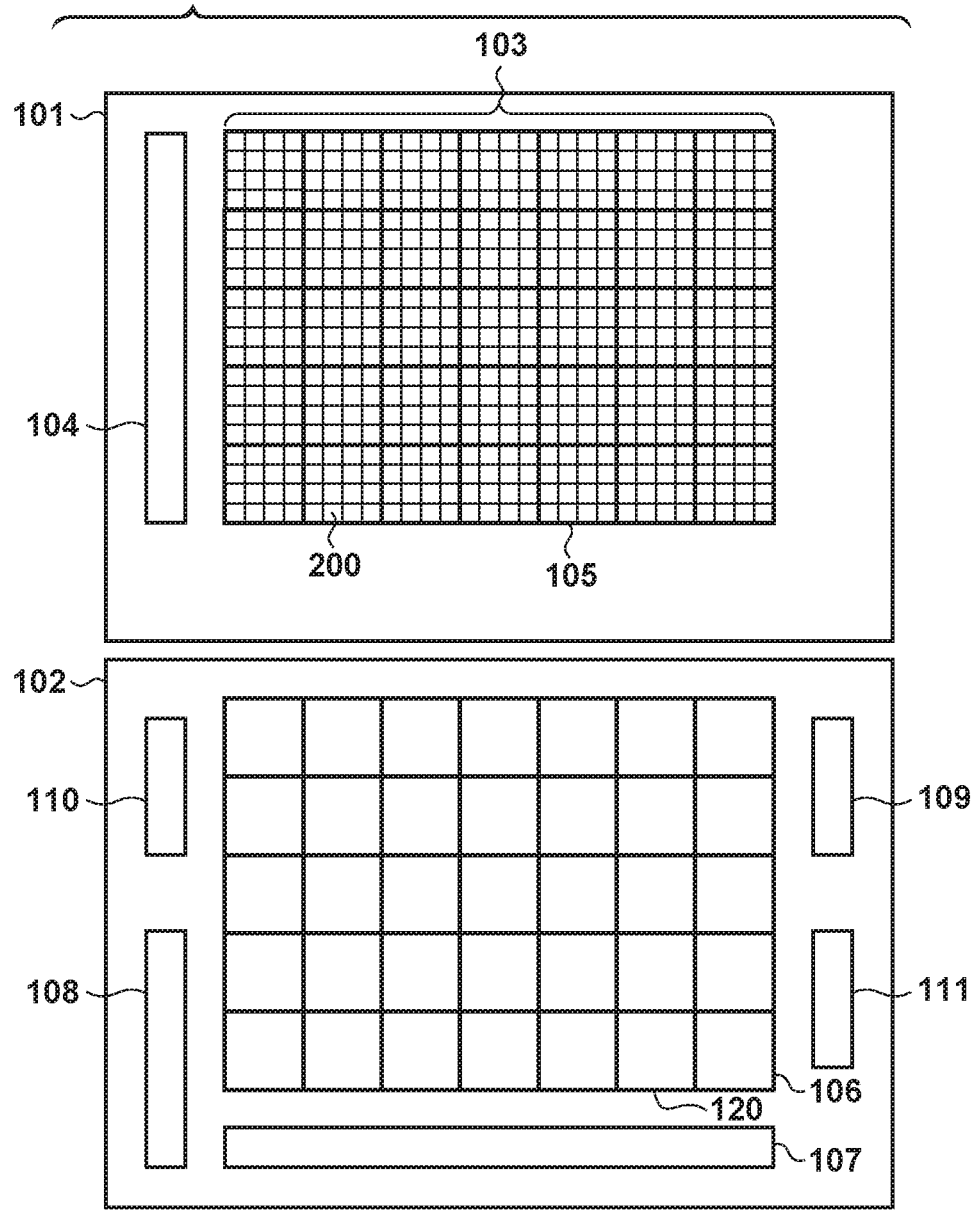

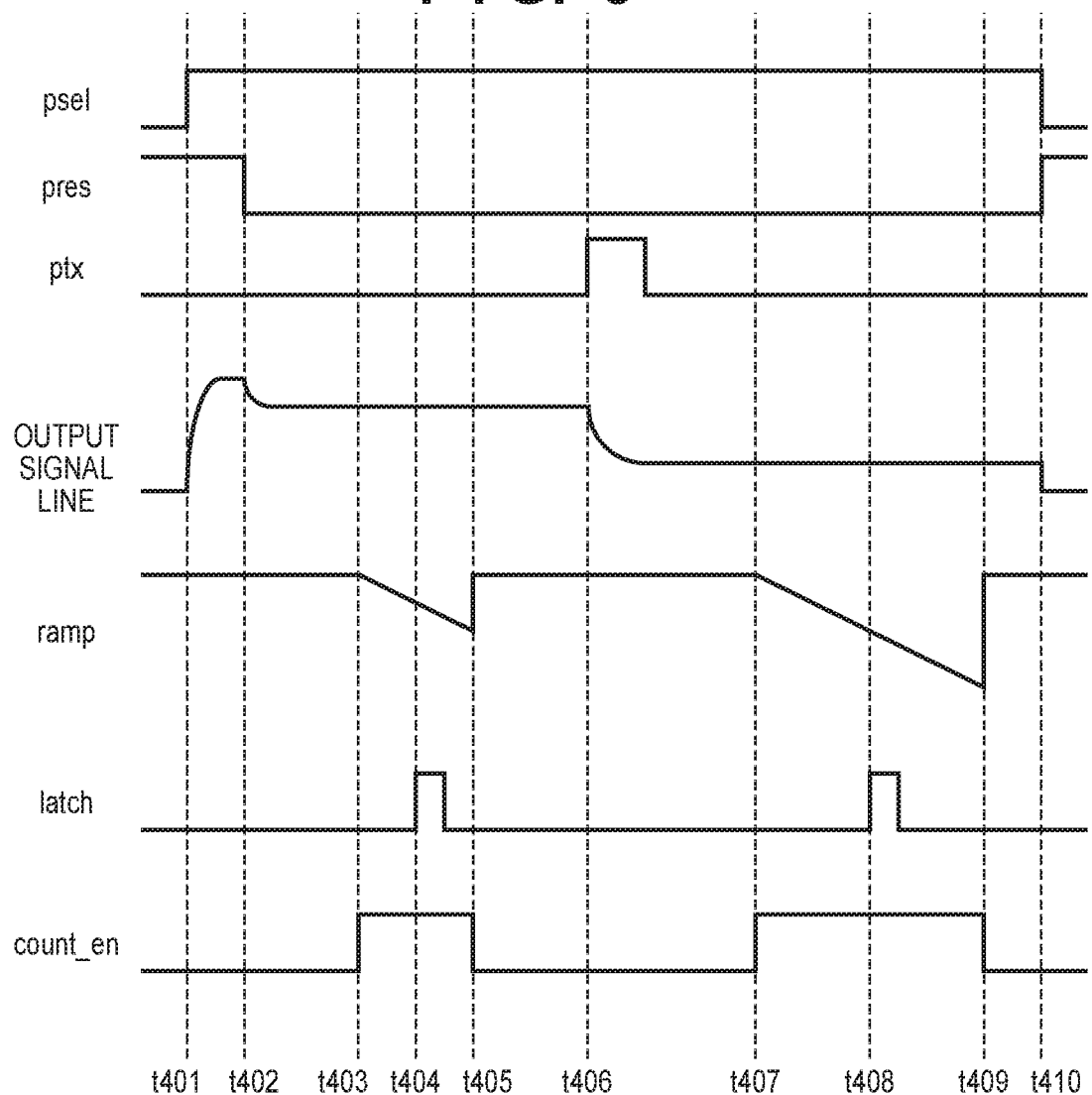

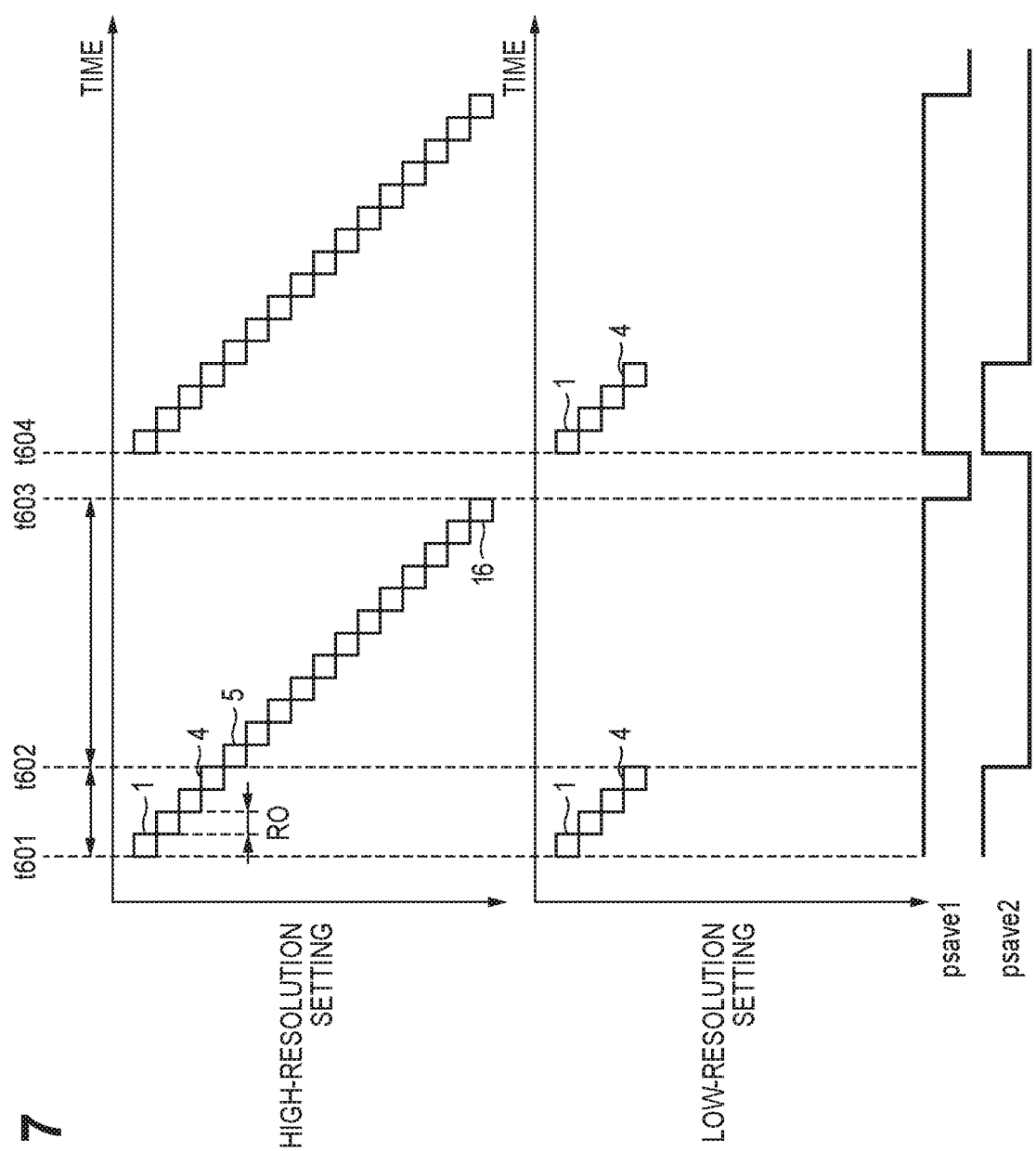

IMAGE CAPTURING APPARATUS AND CONTROL METHOD THEREOF

BACKGROUND OF THE INVENTION

Field of the Invention

The present invention relates to image capturing apparatuses and control methods thereof.

Description of the Related Art

In past image sensors, the readout circuitry through which pixel signals are AD-converted has been shared among a plurality of rows in the same column of the pixel region. However, as a technique for reading out pixel signals from an image sensor at high speeds, a method is known in which the readout circuitry is shared among a smaller number of pixels than in the past, i.e., in units of several pixels.

For example, a configuration has been proposed in which pixels and a signal processing circuit are provided on separate substrates, with the substrates laminated to each other and connected by microbumps. Providing the pixel substrate and the signal processing substrate separately makes it possible to provide a single readout circuit for each set of a relatively small number of pixels, without a drop in the optical characteristics of the pixels.

As an image sensor with this type of layered configuration, Japanese Patent Laid-Open No. 2016-72863 discloses a configuration including a pixel substrate and a signal processing substrate. In the pixel substrate, pixel blocks constituted by at least 2×2 pixels, for a total of four pixels, are arranged in a matrix. In the signal processing substrate, signal processing units, each including an AD conversion circuit, are arranged in a matrix so as to correspond to the respective pixel blocks.

Image capturing control can be carried out with different settings for the framerate, resolution, and the like of each of the pixel blocks. This makes it possible to read out pixel blocks outside a region of interest (ROI) at lower framerates, lower resolutions, and so on, which in turn makes it possible to achieve a lower data amount than when reading out all regions at high framerates or high resolutions.

According to the aforementioned past technique disclosed in Japanese Patent Laid-Open No. 2016-72863, the image capturing settings are changed through control that uses different driving lines for each pixel block. This increases the number of driving lines of the readout circuits operating in parallel. To address this issue, it is desirable that the number of driving lines be reduced by using a common driving line for the readout circuits of the pixel blocks.

However, if a common driving line is used for all the readout circuits and control is carried out using image capturing settings that are different for each pixel block, the load on the driving line will change as the readout circuits switch between operational and non-operational states. This may produce differences in the output signals between frames, level differences in signals within pixel blocks, and the like, leading to a drop in image quality.

SUMMARY OF THE INVENTION

Having been achieved in light of the foregoing issue, the present invention provides an image capturing apparatus capable of suppressing a drop in image quality arising when control is carried out using different image capturing settings for each of pixel blocks.

According to a first aspect of the present invention, there is provided an image capturing apparatus comprising: a pixel portion in which a plurality of pixel blocks are arranged in a matrix, each pixel block including a predetermined number of pixels; a plurality of readout circuits arranged corresponding to the plurality of pixel blocks; and at least one processor or circuit configured to function as the following units: a supply unit that supplies drive signals to the plurality of readout circuits; a setting unit that sets image capturing conditions for each of the plurality of pixel blocks; and a control unit that carries out control so that when the setting unit has set different image capturing conditions for a first pixel block and a second pixel block that is different from the first pixel block, the supply unit supplies a first drive signal to the readout circuits corresponding to the first pixel block, and supplies a second drive signal that is different from the first drive signal to the readout circuits corresponding to the second pixel block.

According to a second aspect of the present invention, there is provided a method of controlling an image capturing apparatus, the apparatus including a pixel portion in which a plurality of pixel blocks are arranged in a matrix, each pixel block including a predetermined number of pixels, a plurality of readout circuits arranged corresponding to the plurality of pixel blocks, and a supply circuit that supplies drive signals to the plurality of readout circuits, the method comprising: setting image capturing conditions for each of the plurality of pixel blocks; and carrying out control so that when different image capturing conditions have been set for a first pixel block and a second pixel block that is different from the first pixel block, the supply circuit supplies a first drive signal to the readout circuits corresponding to the first pixel block, and supplies a second drive signal that is different from the first drive signal to the readout circuits corresponding to the second pixel block.

Further features of the present invention will become apparent from the following description of exemplary embodiments with reference to the attached drawings.

BRIEF DESCRIPTION OF THE DRAWINGS

FIG. 1 is a diagram illustrating the configuration of a first embodiment of an image capturing apparatus according to the present invention, FIGS. 2A and 2B are diagrams illustrating the configuration of an image sensor according to the first embodiment.

FIG. 5 is a timing chart illustrating an example of a method for driving an image sensor.

FIGS. 6A and 6B are diagrams illustrating an example of a pixel block readout order, FIG. 7 is a timing chart illustrating an example of a method for driving an image sensor.

DESCRIPTION OF THE EMBODIMENTS

Figure 3:
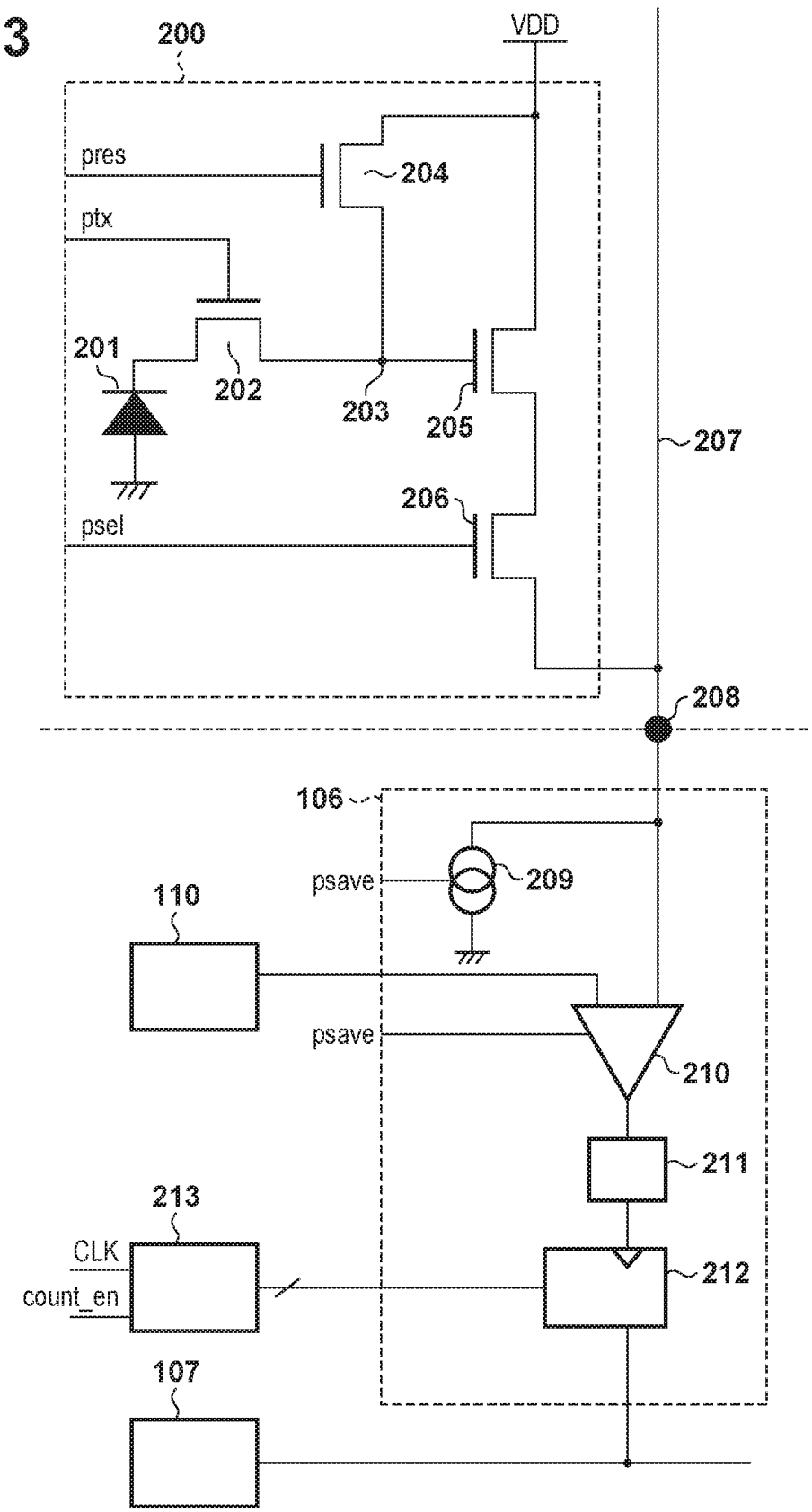
FIG. 3 is a diagram illustrating an example of the configurations of a pixel and a readout circuit.

Hereinafter, embodiments of the present invention will be described in detail with reference to the appended drawings.

First Embodiment

FIG. 1 is a diagram illustrating the configuration of a digital camera 1000 serving as a first embodiment of an image capturing apparatus according to the present invention. As illustrated in FIG. 1, light from a subject traverses an image capturing optical system 1120 and forms a subject image on an image sensor 100. A fixed first group lens 1101, a zoom lens 1102 that changes magnification by moving along an optical axis, an aperture stop 1103 that adjusts the light amount, and a fixed second group lens 1104 are arranged in that order from the subject side in the image capturing optical system 1120.

A focus lens 1105 that has both a function for correcting image plane fluctuations resulting from the magnification, and a focus function, is provided as well. Although each lens group is depicted as being constituted by a single lens in FIG. 1, the lens groups may actually be constituted by a single lens or by a plurality of lenses.

The image sensor 100 is a photoelectric conversion element constituted by a CMOS sensor. The image sensor 100 converts an analog signal obtained through photoelectric conversion performed on the subject image into a digital signal, and outputs the digital signal. A camera signal processing circuit 1108 generates an image signal by carrying out various types of image processing on the output signal from the image sensor 100.

An autofocus (AF) signal processing circuit 1081 is provided in the camera signal processing circuit 1108. The AF signal processing circuit 1081 extracts a high-frequency component from the signals from pixels in a region used for focus detection, among the signals from all the pixels in the image sensor 100.

A focus signal is then generated using a luminance difference component and the like generated from that high-frequency signal. The focus signal is also referred to as a "contrast evaluation value signal", and expresses the sharpness (contrast state) of an image generated on the basis of the output signal from the image sensor 100. The sharpness changes depending on the focus state of the image capturing optical system 1120, and thus the focus signal is ultimately a signal expressing the focus state of the image capturing optical system 1120.

A display device 1109 displays the image signal from the camera signal processing circuit 1108, and a recording device 1110 records the image signal from the camera signal processing circuit 1108 into a recording medium such as magnetic tape an optical disk, semiconductor memory, or the like. A camera microcomputer 1111 moves the focus lens 1105 in the optical axis direction by controlling a focus lens driving unit 1113 (described later) on the basis of the output from the camera signal processing circuit 1108. This operation is carried out mainly by an AF control unit 1121 provided in the camera microcomputer 1111.

The AF control unit 1121 also carries out actual focus control in accordance with a target position that has been determined for the focus lens 1105. During magnification (zooming), the AF control unit 1121 furthermore carries out zoom tracking control, which moves the focus lens 1105 on the basis of zoom tracking data (zoom tracking cam) stored in advance. This makes it possible to prevent image plane fluctuations (blur) arising during magnification, Note that the camera microcomputer 1111 also controls the operations of the image sensor 100.

A zoom lens driving unit 1112 carries out magnification operations by moving the zoom lens 1102, and the focus lens driving unit 1113 adjusts the focus by moving the focus lens 1105. The zoom lens driving unit 1112 and the focus lens driving unit 1113 each include a driving source such as a stepping motor, a DC motor, an oscillating motor, a voice coil motor, or the like.

FIGS. 2A and 2B are diagrams illustrating the configuration of the image sensor according to the present embodiment.

As illustrated in FIG. 2A, the image sensor 100 has a configuration in which a pixel substrate 101 and a signal processing substrate 102 are layered together. Interconnects on the substrates are electrically connected using through-silicon vias or the like. FIG. 2B is a diagram illustrating circuitry formed on the pixel substrate 101 and the signal processing substrate 102.

The pixel substrate 101 includes a pixel region (pixel portion) 103, and a scanning circuit 104 that drives and scans the pixels. The pixel region 103 is constituted by a plurality of unit pixels 200 (described later) being arranged in a matrix. In the present embodiment, a block in which 4×4, i.e., 16 (a predetermined number) unit pixels, which are enclosed in the bold frame, are arranged, is defined as a pixel block 105.

The signal processing substrate 102 includes a readout region 120 constituted by a plurality of readout circuits 106 arranged in a matrix. The signal processing substrate 102 also includes a digital signal processing circuit 107, a digital signal output circuit 108, a bias voltage generating circuit 109, a ramp voltage generating circuit 110, and a timing generator 111 ("TG 111" hereinafter).

With respect to the correspondence relationship between the pixel blocks 105 and the readout circuits 106, in FIG. 1B, the pixel block 105 furthest to the upper-left in the pixel region 103 of the pixel substrate 101 is connected to the readout circuit 106 furthest to the upper-left in the readout region 120 of the signal processing substrate 102. The other corresponding blocks are connected in the same manner. Connecting the blocks in this manner makes it possible to shorten the output signal lines from the pixels, which makes it possible to configure the image sensor 100 without increasing the resistance and capacitance of the output signal lines.

The TG 111 sends signals to the scanning circuit 104, the readout circuits 106, the digital signal processing circuit 107, the digital signal output circuit 108, the bias voltage generating circuit 109, and the ramp voltage generating circuit 110 to control the driving of those circuits. The scanning circuit 104 sends drive signals to each of the unit pixels in the pixel region 103 to control the driving of the pixels, including charge reset, accumulation, transfer, signal output to the readout circuits 106, and the like.

The readout circuits 106 receive the output signals from the unit pixels and carry out analog-digital conversion (AD conversion) under the control of the TG 111, and in response to signals from the bias voltage generating circuit 109 and the ramp voltage generating circuit 110. The pixel signals converted into digital values are subjected to digital signal processing by the digital signal processing circuit 107, and are then output in sequence to the exterior of the image sensor 100 by the digital signal output circuit 108. A number of readout circuits equivalent to the total number of pixels divided by 16 operate in parallel during the operations carried out until the pixel signals are AD-converted, and thus the pixel signals can be read out at a high speed.

Although FIGS. 2A and 2B illustrate a configuration in which each pixel block 105 is constituted by 4×4, i.e., 16, unit pixels, the number of pixels is not limited thereto. The actual image sensor 100 is constituted by several thousand to several tens of thousands of pixel blocks and readout circuits.

FIG. 3 is a diagram illustrating the configuration of the unit pixels 200 and the readout circuits 106 of the image sensor 100. FIG. 3 illustrates only a single unit pixel and a single readout circuit for the sake of simplicity.

The unit pixels 200 formed on the pixel substrate 101 are connected to the readout circuits 106 formed on the signal processing substrate 102 by bumps 208.

In the unit pixel 200, a photoelectric conversion portion 201 generates a charge based on incident light. A transfer transistor 202 is provided in the electrical path between the photoelectric conversion portion 201 and a floating diffusion (FD) portion 203. The transfer transistor 202 switches the transfer of the charge from the photoelectric conversion portion 201 to the FD 203 on and off.

A reset transistor 204 has one main node electrically connected to the FD 203, with a source voltage VDD supplied to the other main node. The reset transistor 204 switches the resetting of the potential at the FD 203 on and off. The input node of an amplifying transistor 205 is electrically connected to the FD 203. The source voltage VDD is supplied to one main node of the amplifying transistor 205, and one main node of a selecting transistor 206 is electrically connected to the other main node of the amplifying transistor 205.

The amplifying transistor 205 outputs an analog signal based on the potential at the FD 203. An output signal line 207 is electrically connected to the other main node of the selecting transistor 206. The selecting transistor 206 switches the connection between the amplifying transistor 205 and the output signal line 207 on and off.

A signal ptx, a signal pres, and a signal psel are supplied from the scanning circuit 104 to the control nodes of the transfer transistor 202, the reset transistor 204, and the selecting transistor 206, respectively. The signal pres from the scanning circuit 104 can control the pixels in units of pixel blocks, whereas the signal ptx and the signal psel can control the pixels in units of predetermined unit pixels within the pixel blocks.

The amplifying transistor 205 carries out source-follower operations using current supplied from a current supply unit 209, which is part of the readout circuit 106 connected to the output signal line 207, and the source voltage VDD. The current source, which is the current supply unit 209, supplies the current to the amplifying transistor 205 of the unit pixel 200 via the output signal line 207.

The circuit configuration of the readout circuit 106 will be described next. The readout circuit 106 is constituted by the current supply unit 209, a comparator 210, a latch circuit 211, and a signal holding unit 212. The readout circuit 106 can control the pixels in units of pixel blocks using a signal psave from the TG 111. The readout circuit 106 enters an operating state when the signal psave is Hi and a non-operating state when the signal psave is Lo. In other words, the signal psave is a signal that controls the driving state of the readout circuit 106. The readout circuit 106 enters the non-operating state aside from when reading out pixel signals and is therefore suited to saving energy. The configuration of the current supply unit 209 according to the present embodiment will be described later using FIG. 10.

The output signal line 207 is connected to one input of the comparator 210, and a ramp voltage Vramp supplied from the ramp voltage generating circuit 110 is input to the other input of the comparator 210. The output of the comparator 210 is input to the latch circuit 211. The comparator 210 compares the analog signal output by the unit pixel 200 with the ramp voltage Vramp.

When the signal psave is Lo, the current supply unit 209 stops supplying the current to the amplifying transistor 205 of the unit pixel 200. The comparator 210 stops as well. The readout circuit 106 enters the non-operating state as a result.

The latch circuit 211 generates a latch signal latch based on the comparison result and outputs the latch signal latch to the signal holding unit 212. A counter 213 outputs, to the signal holding unit 212, a count signal produced by counting a clock signal CLK. The counter 213 counts the clock signal CLK on the basis of a signal count_en output from the TG 111.

The signal holding unit 212 holds the count signal output from the counter 213 as a digital signal when the latch signal latch output from the latch circuit 211 changes. The analog signal from the unit pixel 200 is AD-converted into a digital signal as a result.

The digital signal processing circuit 107 progressively scans the signal holding units 212 in the pixel blocks. As a result, the digital signals held by the signal holding units 212 are sequentially transferred from the signal holding units 212 to the digital signal processing circuit 107 in units of pixel blocks.

The unit pixels 200 included in each pixel block 105 are controlled with image capturing settings that are different for each pixel block 105. In other words, the plurality of unit pixels included in a given pixel block output pixel signals through control that is different from that used for the plurality of unit pixels included in a different pixel block.

Figure 4A:
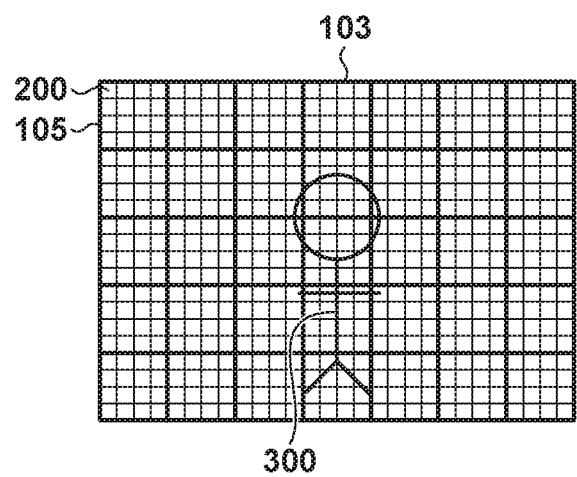
FIGS. 4A and 4B are diagrams illustrating examples of image capturing settings that differ for each of pixel blocks.
Figure 4B:
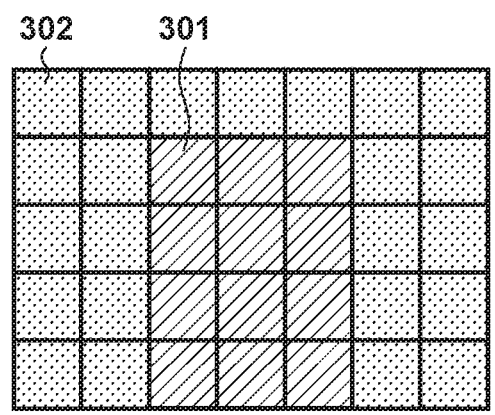

FIGS. 4A and 4B are diagrams illustrating a relationship between the position of a subject and the pixel blocks. Control carried out using different image capturing settings for pixel blocks where the subject is present and pixel blocks where the subject is not present, for example, will be described using FIGS. 4A and 4B. FIG. 4A schematically illustrates the pixel region 103 of the image sensor 100 and a subject 300 in an overlapping state. FIG. 4B illustrates the pixel blocks 105.

When the subject 300 is present in a position such as that indicated in FIG. 4A, the pixel blocks, among the plurality of pixel blocks in FIG. 4B, which correspond to the subject 300 are defined as a subject pixel block region 301. The pixel blocks aside from those corresponding to the subject 300 are defined as a non-subject pixel block region 302.

The pixel signals are output using different image capturing settings for the subject pixel block region 301 and the non-subject pixel block region 302. A thinning rate, the number of rows or columns for mixing pixel signals, the framerate, and the like can be given as examples of image capturing settings.

In the present embodiment, "thinning rate" means the ratio of pixels from which pixel signals are read out to the total number of unit pixels in a given pixel block. For example, if the thinning rate is 0 for a pixel block, the pixel signals are read out from all the unit pixels in that pixel block. If the thinning rate is 0.75 for a pixel block, the pixel signals are read out from ¼ of the unit pixels in that pixel block. The subject 300 can be captured with more clarity the lower the thinning rate is.

The number for mixing pixels refers to mixing the pixel signals from unit pixels adjacent in the row or column direction, and is the number of the unit pixels that are mixed. Such a mixing process is realized using transistors (not shown) connected between the FDs 203 of adjacent unit pixels 200, for example. The mixing process can also be realized by turning each of the selecting transistors 206 in adjacent ones of the unit pixels 200 on simultaneously to carry out the mixing in the output signal lines 207, for example. Mixing the pixel signals from the adjacent unit pixels in this manner achieves a similar effect as when the pixel signals of the unit pixels are read out after being thinned at a given thinning rate.

The "framerate" refers to the number of frames read out per unit of time. The higher the framerate is, the smoother the movement of the subject 300 will become, which makes it less likely for image blur to arise. For example, the readout circuits 106 corresponding to the non-subject pixel block region 302, which does not contain the subject 300, are read out using low-framerate or low-resolution image capturing settings, for example. Doing so makes it possible to reduce the amount of data as compared to a situation where all regions are read out using a high framerate or a high resolution.

FIG. 5 is a timing chart illustrating an example of operations for reading out charges from the unit pixels 200 in the image sensor 100 having the circuit configuration illustrated in FIG. 3.

At time t401, the scanning circuit 104 sets the signal psel to Hi, and the selecting transistor 206 is turned on. As a result, the amplifying transistor 205 of the unit pixel 200 is electrically connected to the output signal line 207 by the selecting transistor 206.

At time t402, the signal pres goes to Lo, and the reset transistor 204 turns off. The resetting of the FD 203 is canceled as a result, A noise signal based on the potential at the FD 203, the resetting of which has been canceled, is output to the output signal line 207 from the unit pixel 200.

At time t403, the ramp voltage generating circuit 110 starts changing a potential of the ramp voltage Vramp which depends on the time. Meanwhile, the signal count_en goes to Hi, and the counter 213 starts operations for counting the clock signal.

At time t404, the magnitude relationship between the noise signal output from the unit pixel 200 and the ramp voltage Vramp inverts, and the output signal from the comparator 210 changes. In response to the output signal from the comparator 210 changing, the output signal latch from the latch circuit 211 changes from Lo to Hi. When the signal value of the latch signal latch changes from Lo to Hi, the signal holding unit 212 holds the count value at that time. The count value held by the signal holding unit 212 at this time is a digital signal based on the noise signal.

At time t405, the ramp voltage generating circuit 110 stops changing the potential of the ramp voltage Vramp which depends on the time, so that the potential become the same potential as that from time t403. Meanwhile, the signal count_en goes to Lo, and the counter 213 stops the operations for counting the clock signal and resets the count value.

At time t406, the scanning circuit 104 sets the signal ptx to Hi. As a result, the photoelectrically converted signal is output from the unit pixel 200 to the output signal line 207.

At time t407, the ramp voltage generating circuit 110 starts changing a potential of the ramp voltage Vramp which depends on the time. Meanwhile, the signal count_en goes to Hi, and the counter 213 starts operations for counting the clock signal.

At time t408, the magnitude relationship between the photoelectrically converted signal output from the unit pixel 200 and the ramp voltage Vramp inverts, and the output signal from the comparator 210 changes. In response to the output signal from the comparator 210 changing, the output signal latch from the latch circuit 211 changes from Lo to Hi. When the signal value of the latch signal latch changes from Lo to Hi, the signal holding unit 212 holds the count value at that time. The count value held by the signal holding unit 212 at this time is a digital signal based on the photoelectrically converted signal.

At time t409, the ramp voltage generating circuit 110 stops changing the potential of the ramp voltage Vramp which depends on the time, so that the potential become the same potential as that from time t403. Meanwhile, the signal count_en goes to Lo and the counter 213 stops the operations for counting the clock signal and resets the count value.

At time t410, the scanning circuit 104 sets the signal psel to Lo, and the selecting transistor 206 turns off. As a result, the amplifying transistor 205 of the unit pixel 200 is electrically disconnected from the output signal line 207 by the selecting transistor 206. Meanwhile, the signal pres goes to Hi and the reset transistor 204 turns on. The FD 203 is reset by the source voltage VDD as a result.

After time t410, the digital signal processing circuit 107 progressively scans the signal holding units 212, and transfers the digital signals held in the pixel blocks to the digital signal processing circuit 107. The digital signals based on the photoelectrically converted signals contain digital signal components based on the noise signals. Accordingly, by the digital signal processing circuit 107 subtracting the digital signal based on the noise signal from the digital signal based on the photoelectrically converted signal, a digital signal with little noise signal (an S-N signal) is generated.

A time RO from time: t401 to t410 is the amount of time required to read out the pixel signal from the unit pixel, and one frame's worth of readout is completed by repeating this readout driving the same amount of times as there are unit pixels constituting the pixel blocks. The time RO×the number of unit pixels to be read out (the number of unit pixels constituting a single pixel block) thus corresponds to the time required to read out a single frame.

Here, a situation where the image capturing settings (image capturing conditions) have been changed from pixel block to pixel block will be described using FIGS. 6A, 6B, and 7. The present embodiment describes an example in which different thinning rates are used between the subject pixel block region 301 and the non-subject pixel block region 302 described using FIGS. 4A and 4B, as an example of using different image capturing settings.

In the subject pixel block region 301, the thinning rate is set to 0 and the pixel signals are read out at a high resolution. In the non-subject pixel block region 302, the thinning rate is set to 0.75 and the pixel signals are read out at a low resolution.

FIG. 6A is a diagram illustrating the pixel signal readout order for the unit pixels in the subject pixel block region 301 in which the pixel signals are read out at a high resolution. The numbers inside the squares indicate the readout order. When 4×4, i.e., 16 unit pixels constitute a single pixel block, the pixel signals are read out from all 16 pixels in order. The readout time for the pixel signals of one frame at this time is 16×RO.

FIG. 6B is a diagram illustrating the pixel signal readout order for the unit pixels in the non-subject pixel block region 302 in which the pixel signals are read out at a low resolution. When 4×4, i.e., 16 unit pixels constitute a single pixel block, the pixel signals are read out from only four of the 16 pixels in order. The readout time for the pixel signals of one frame at this time is 4×RO.

In this manner, only the pixel signals in necessary locations where the subject is present can be read out at a high resolution, and the pixel signals from other parts can be read out at a low resolution.

The readout circuits corresponding to the pixel blocks for which the pixel signal readout is complete are driven in a power-saving mode by reducing the power after the pixel signal readout has ended. The amount of power consumed can be reduced by restoring the circuits from the power-saving mode before reading out the pixel signals from the next frame.

The operations for a single frame and the driving states of the readout circuits will be described next using FIG. 7. The readout circuits corresponding to the subject pixel block region 301 are in an operating state when a signal psave1 is Hi and in a non-operating state when the signal psave1 is Lo. The readout circuits corresponding to the non-subject pixel block region 302 are in an operating state when a signal psave2 is Hi and in a non-operating state when the signal psave2 is Lo. Time t601 to time t604 represents a single frame.

At time t601, both the signal psave1 and the signal psave2 are Hi, and thus the readout circuits 106 corresponding to both the subject pixel block region 301 and the non-subject pixel block region 302 are in an operating state.

At time t602, the signal psave2 goes to Lo, and the readout circuits 106 corresponding to the non-subject pixel block region 302 enter a non-operating state. In other words, after four unit pixels in the pixel block have been read out, the signal psave2 goes to Lo and the readout circuits 106 enter a non-operating state.

At time t603, the signal psave1 goes to Lo, and the readout circuits 106 corresponding to the subject pixel block region 301 enter a non-operating state. In other words, after the signals from all 16 unit pixels in the pixel block have been read out, the signal psave1 goes to Lo and the readout circuits 106 enter a non-operating state.

At time t604, the signal readout starts for the next frame. As such, both the signal psave1 and the signal psave2 go to Hi, and thus the readout circuits 106 corresponding to both the subject pixel block region 301 and the non-subject pixel block region 302 enter an operating state.

The readout circuits corresponding to both the subject pixel block region 301 and the non-subject pixel block region 302 are in an operating state from time t601 to time t602. Only the readout circuits 106 corresponding to the subject pixel block region 301 are in an operating state from time t602 to time t603. In the case of FIG. 4B, only 12 readout circuits, among a total of 35 (5×7) readout circuits, are in an operating state.

At this time, if a common driving line is connected to the readout circuits 106, fluctuations in the load on the driving line will propagate and cause a drop in image quality.

Operations according to the present embodiment for solving this problem will be described later using FIG. 10, but first, a specific example of the problem will be described. The current supply unit 209 connected to the output signal line 207 will be used as a specific example.

Figure 8:
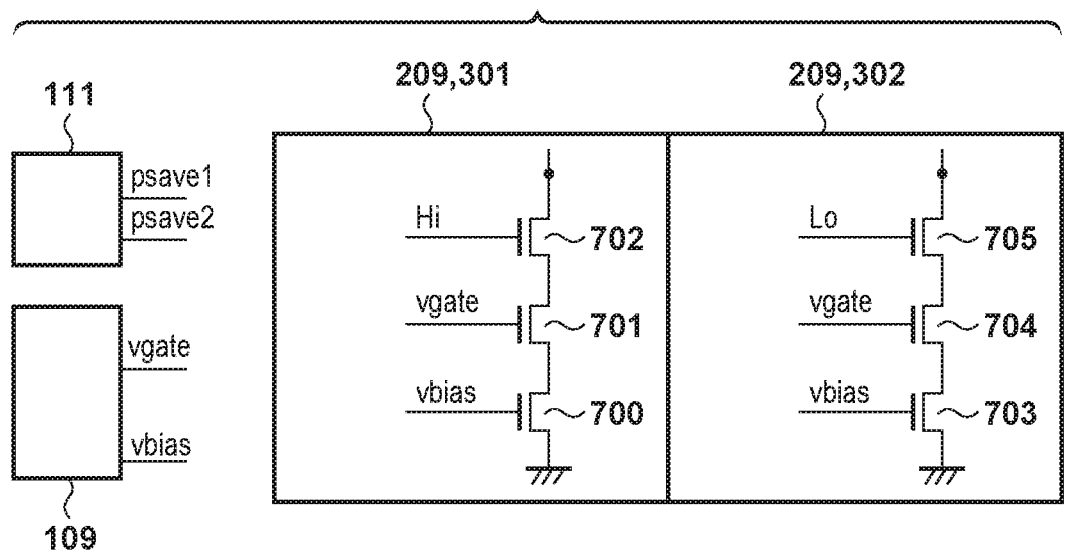
FIG. 8 is a diagram illustrating the configuration of a past current supply unit.

FIG. 8 is a diagram illustrating the state of a past current supply unit from time t602 to time t603 in FIG. 7.

The current supply unit 209 of the readout circuit corresponding to the subject pixel block region 301 is a cascode-type constant current circuit in which transistors 700 and 701 are connected in series to the output signal line 207. The supply of current to the output signal line 207 is switched by a transistor 702.

Similarly, the current supply unit 209 of the readout circuit corresponding to the non-subject pixel block region 302 is a cascode-type constant current circuit in which transistors 703 and 704 are connected in series to the output signal line 207. The supply of current to the output signal line 207 is switched by a transistor 705.

A drive signal vbias (bias voltage signal) supplied by the bias voltage generating circuit 109 is input to the gates of the transistors 700 and 703. A drive signal vgate supplied by the bias voltage generating circuit 109 is input to the gates of the transistors 701 and 704. The drive signals vbias and vgate are constant voltages set so that a desired current value is supplied.

From time t602 to time t603 in FIG. 7, the current supply unit 209 corresponding to the subject pixel block region 301 is in an operating state. Hi is input to the gate of the transistor 702, and current is supplied to the output signal line 207. On the other hand, the current supply unit 209 corresponding to the non-subject pixel block region 302 is in a non-operating state. Lo is input to the gate of the transistor 705, and no current is supplied to the output signal line 207.

When the gate voltage of the transistor 705 is Lo, the source voltage of the transistor 705 drops, and the drive signal fluctuates due to the gate-drain capacitance of the transistor 704. As a result, the input to the transistor 701, which operates under the common drive signal vgate, fluctuates as well.

Figure 9:
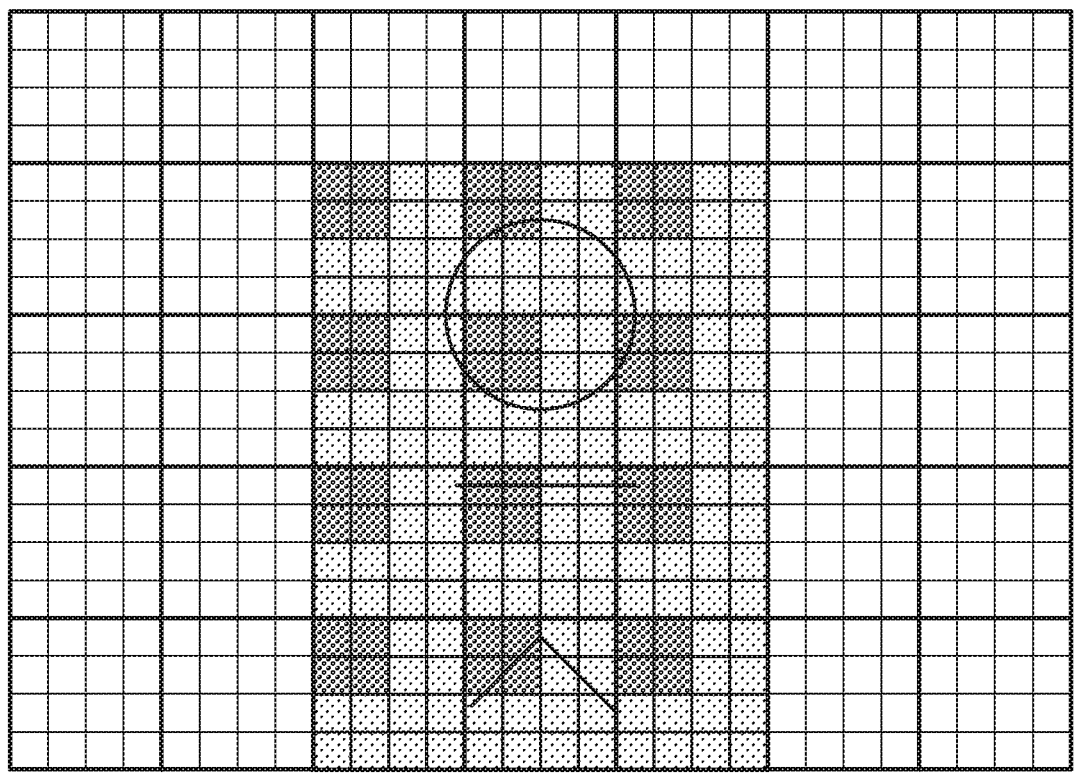
FIGS. 9A and 9B are diagrams illustrating an example of an issue to be solved.

The value of the current flowing from the current supply unit 209 in the readout circuit corresponding to the subject pixel block region 301 is different between the period from time t601 to time t602 and the period from time t602 to time t603, which causes the pixel signal to fluctuate. Even if subjects having the same luminance have been captured, the difference in the pixel signal outputs causes a level difference between signals in the pixel blocks to arise in the signals from the pixel blocks in the subject pixel block region 301, as indicated in FIG. 9A.

The "level difference between signals in the pixel blocks" refers to a level difference between the signals of the pixels from the first to fourth pixels in the readout order, and the pixels from the fifth to 16th pixels in the readout order. When a level difference arises within the pixel block for each pixel block in the subject pixel block region 301, a drop in the image quality appears as patterned noise, as indicated in FIG. 9B.

Thus when a common driving line is used for the readout circuits operating in parallel and control is carried out so that different thinning rates are used from pixel block to pixel block, the image quality will drop when the readout is performed using the common driving line.

Operations according to the present embodiment, for solving the above-described problem, will be described using FIG. 10.

Figure 10:
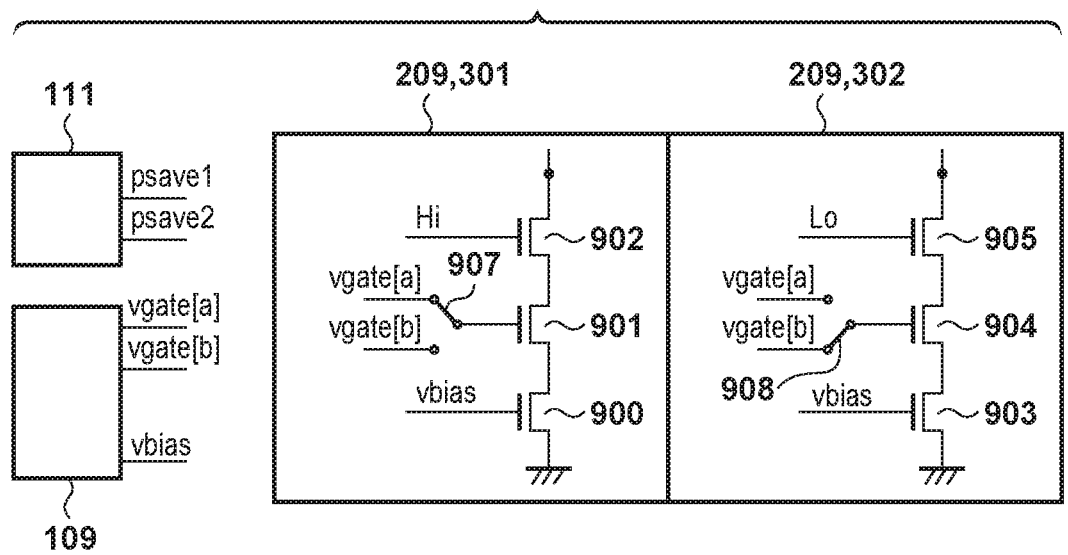
FIG. 10 is a diagram illustrating the configuration of a current supply unit according to first and second embodiments.

FIG. 10 is a diagram illustrating the state of the current supply unit 209 from time t602 to time t603 in FIG. 7, according to the present embodiment.

The current supply unit 209 of the readout circuit 106 is a cascode-type constant current circuit in which transistors 900 and 901 are connected in series to the output signal line 207. The supply of current to the output signal line 207 is switched by a transistor 902.

Similarly, the current supply unit 209 of the readout circuit corresponding to the non-subject pixel block region 302 is a cascode-type constant current circuit in which transistors 903 and 904 are connected in series to the output signal line 207. The supply of current to the output signal line 207 is switched by a transistor 905.

The drive signal vbias, which is set so that a desired current value is supplied, is input to the gates of the transistors 900 and 903 from the bias voltage generating circuit 109. A drive signal vgate[a] or vgate[b], selected by switches 907 and 908 (connection changing switches), is input to the gates of the transistors 901 and 904.

The switch 907 supplies one of the drive signal vgate[a] and vgate[b] (bias lines), which are supplied from the bias voltage generating circuit 109, to the gate of the transistor 901. Likewise, the switch 908 supplies one of the drive signal vgate[a] and vgate[b] (bias lines), which are supplied from the bias voltage generating circuit 109, to the gate of the transistor 904.

In the current supply unit 209 corresponding to the subject pixel block region 301, vgate[a] is input to the gate of the transistor 901. Meanwhile, in the current supply unit 209 corresponding to the non-subject pixel block region 302, vgate[b] is input to the gate of the transistor 904.

In the period from time t602 to time t603 in FIG. 7, Lo is input to the gate of the transistor 905 in the non-subject pixel block region 302. At this time, the driving line vgate[b] fluctuates, but the driving line vgate[a] does not fluctuate. In other words, the value of the current from the current supply unit 209 in the subject pixel block region 301 does not change, and thus the level difference does not arise within the pixel block.

According to the present embodiment as described thus far, high-resolution pixel signals are read out from the subject pixel block region 301, and low-resolution pixel signals are read out from the non-subject pixel block region 302. When carrying out the readout in this manner, the readout circuits 106 in the subject pixel block region 301 and the readout circuits 106 in the non-subject pixel block regions 302 are connected to different driving lines. A level difference between signals within pixel blocks can be reduced by inputting different drive signals to the readout circuits 106 in the respective block regions.

The present embodiment describes a configuration in which the current supply unit 209 is a cascode-type constant current source. However, the configuration may be such that the driving line vbias is switched to the gate of the transistor 900 as well as the transistor 901, with different drive signals vbias being input by different driving lines in the image capturing settings. Furthermore, the same effects can be achieved even if different drive signals vbias are input by different driving lines in the image capturing settings for the constant current circuit used in the comparator 210 as well.

Second Embodiment

Figure 11:
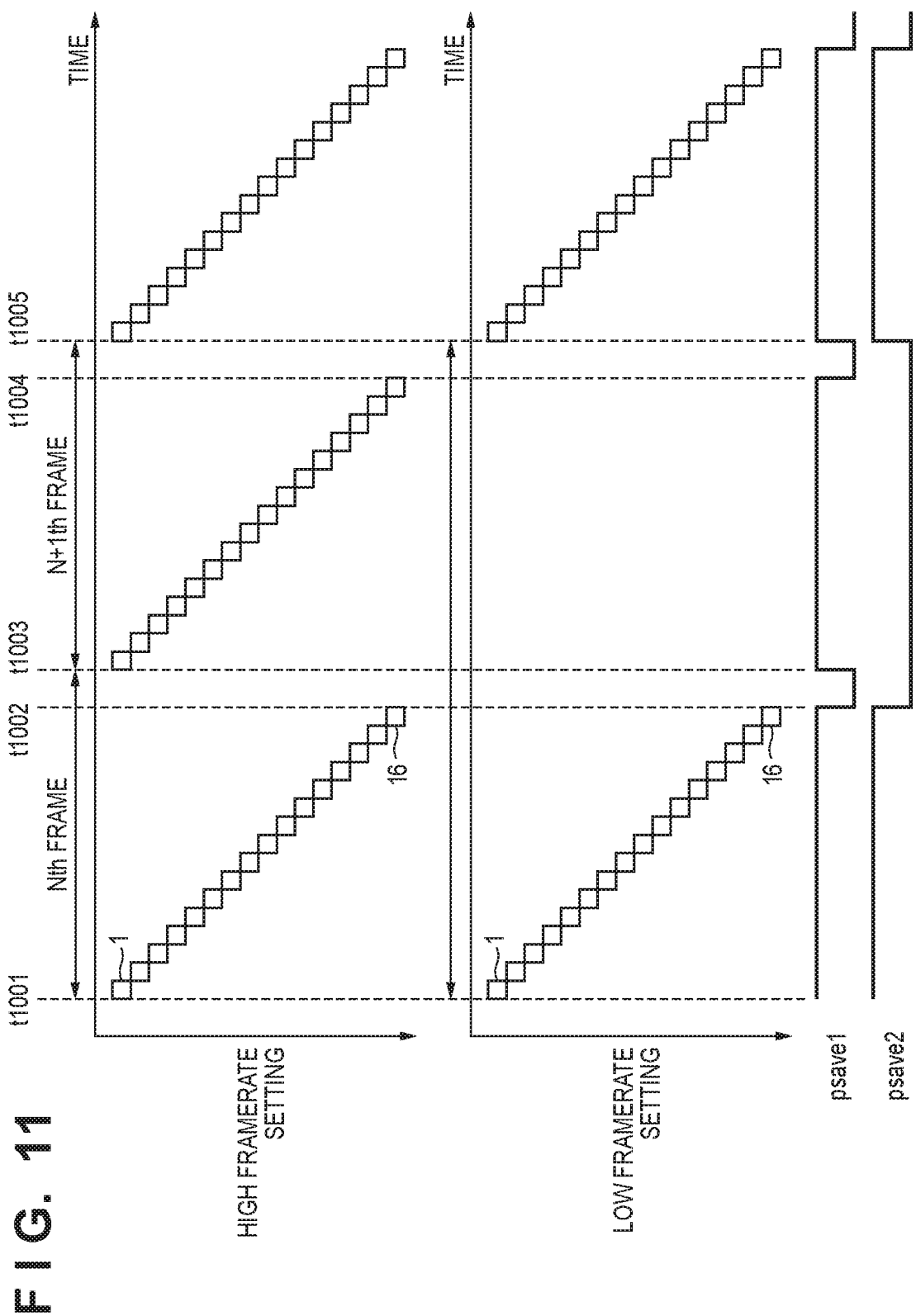
FIG. 11 is a timing chart illustrating an example of a method for driving an image sensor.

The second embodiment is an embodiment in which the framerate is varied as an example of varying the image capturing settings between the subject pixel block region 301 and the non-subject pixel block region 302 described using FIGS. 4A and 4B. FIG. 11 is a diagram illustrating operations for a single frame and the driving states of the readout circuits according to the second embodiment.

The pixel signals are read out from the subject pixel block region 301 at a high framerate. The pixel signals are read out from the non-subject pixel block region 302 at a low framerate. In the present embodiment, the low framerate is assumed to be set to half the high framerate.

As in the first embodiment, a group of 4×4, i.e., 16 unit pixels is taken as a pixel block, and a readout circuit 106 is provided for each pixel block. All 16 unit pixels are read out from both the subject pixel block region 301 and the non-subject pixel block region 302, and thus the readout time is 16×RO, as in the first embodiment.

In the subject pixel block region 301, where the pixel signals are read out at the high framerate, two frames' worth of the pixel signals are read out during a period from time t1001 to time t1005. Meanwhile, in the non-subject pixel block region 302, where the pixel signals are read out at the low framerate, one frame's worth of the pixel signals are read out during the period from time t1001 to time t1005.

The driving states of the readout circuits corresponding to the subject pixel block region 301 are controlled by the signal psave1, and the driving states of the readout circuits corresponding to the non-subject pixel block region 302 are controlled by the signal psave2.

At time t1001, the readout of pixel signals from an Nth frame is started, in order from the 16 unit pixels constituting the pixel block, in the subject pixel block region 301 and the non-subject pixel block region 302.

At time t1002, the pixel signal readout ends for all unit pixels in the pixel block, the signal psave1 and the signal psave2 go to Lo, and the readout circuits enter a non-operating state, in the subject pixel block region 301 and the non-subject pixel block region 302.

At time t1003, the readout circuits enter an operating state in response to the signal psave1 switching to Hi, in the subject pixel block region 301. Then, the readout of pixel signals from an N+1th frame is started, in order from the 16 unit pixels constituting the pixel block. On the other hand, the signal psave2 stays low, and the non-operating state is maintained, in the non-subject pixel block region 302.

At time t1004, the pixel signal readout ends for all unit pixels in the pixel block, the signal psave1 goes to Lo, and the readout circuits 106 enter a non-operating state, in the subject pixel block region 301.

At time t1005, the readout of pixel signals is started, in order from the 16 unit pixels constituting the pixel block, in the subject pixel block region 301 and the non-subject pixel block region 302.

By repeating the above operations, the pixel signals are read out from the subject pixel block region 301 at the high framerate, and the pixel signals are read out from the non-subject pixel block region 302 at the low framerate, which is half the high framerate.

The readout circuits in the non-subject pixel block region 302 are in an operating state in the Nth frame of the subject pixel block region 301. The readout circuits in the non-subject pixel block region 302 are in a non-operating state in the N+1th frame of the subject pixel block region 301.

At this time, if readout operations are carried out in a state where the current supply units 209 of the readout circuits 106 are connected to a common driving line, even if subjects having the same luminance have been captured, an output difference will arise between the pixel signals from the Nth frame and the N+1th frame in the subject pixel block region 301.

A method for solving this problem, according to the present embodiment, will be described, again using FIG. 10. In the present embodiment too, the drive signal vgate from the current supply unit 209 of the readout circuit 106 is switched depending on whether the region is the subject pixel block region 301 or the non-subject pixel block region 302.

Specifically, the state of the current supply unit 209 is controlled as illustrated in FIG. 10 from time t1003 to time t1004.

In the current supply unit 209 corresponding to the subject pixel block region 301, the drive signal vgate[a] is input to the gate of the transistor 901. Meanwhile, in the current supply unit 209 corresponding to the non-subject pixel block region 302, the drive signal vgate[b] is input to the gate of the transistor 904.

In the period from time t1003 to time t1004, Lo is input to the gate of the transistor 905 in the non-subject pixel block region 302. At this time, the drive signal vgate[b] fluctuates, but the drive signal vgate[a] does not fluctuate. In other words, the value of the current from the current supply unit 209 in the subject pixel block region 301 does not change, and thus the output signal difference does not arise between the frames.

Although the present embodiment describes the low framerate as being exactly half the high framerate, the low framerate is not limited thereto. The subject pixel block region 301 and the non-subject pixel block region 302 are driven separately by the drive signals vgate[a] and vgate[b], and thus both framerates may be set independently.

According to the present embodiment as described thus far, pixel signals are read out from the subject pixel block region 301 at a high framerate, and pixel signals are read out from the non-subject pixel block region 302 at a low framerate. When carrying out the readout in this manner, different drive signals are input to the readout circuits 106 in the subject pixel block region 301 and the readout circuits 106 in the non-subject pixel block regions 302. This makes it possible to reduce an output signal difference between frames.

Third Embodiment

Figure 12:
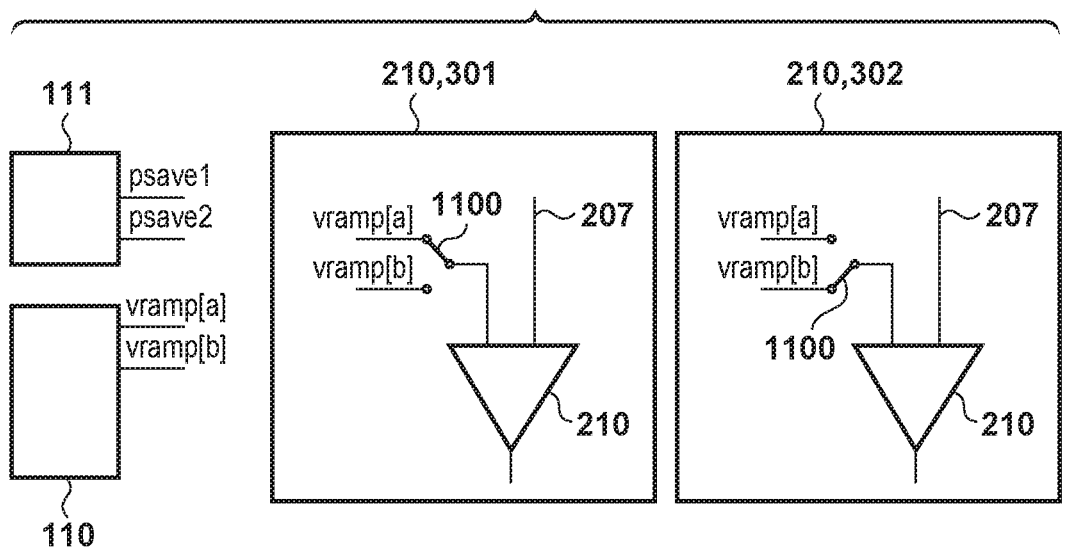
FIG. 12 is a diagram illustrating the configuration of a current supply unit according to a third embodiment.

The present embodiment assumes a configuration in which different ramp voltages Vramp are input to the comparators 210 in the readout circuits 106 depending on whether the region is the subject pixel block region 301 or the non-subject pixel block region 302. FIG. 12 is a diagram illustrating the configuration of the comparator 210 according to the third embodiment.

If the image capturing settings are different for the subject pixel block region 301 and the non-subject pixel block region 302, the operations of the respective comparators 210 may differ as well. In other words, there are situations where even if the comparators 210 in the subject pixel block region 301 are in an operating state, the comparators 210 in the non-subject pixel block region 302 are in a non-operating state.

When AD conversion is carried out by supplying a common ramp signal Vramp to the comparators 210 in all of the readout circuits, the slope of the ramp signal Vramp will vary depending on whether the comparator 210 is in an operating state or a non-operating state. This is because the load capacitance on the ramp signal Vramp line changes when the comparator 210 is set to a non-operating state by the signal psave.

The variation in the slope of the ramp signal Vramp induces a variation in the gain at the time of AD conversion. This variation in the gain produces a level different within the pixel blocks when different thinning rates are set for the subject pixel block region 301 and the non-subject pixel block region 302, and produces a difference in the output signals between framerates when different framerates are set.

Accordingly, in the present embodiment, the ramp signal Vramp input to the comparators 210 of the readout circuits 106 is switched depending on whether the region is the subject pixel block region 301 or the non-subject pixel block region 302. As illustrated in FIG. 12, the output signal line 207 is connected to one input of the comparator 210 of the readout circuit 106, and a switch 1100 is connected to the other input. The output of the comparator 210 is input to the latch circuit 211.

The switch 1100 selects one of a ramp signal Vramp[a] and Vramp[b], which are supplied from the ramp voltage generating circuit 110, to be input to the comparator 210. The ramp signal Vramp[a] is supplied to the comparators 210 corresponding to the subject pixel block region 301, and the ramp signal Vramp[b] is supplied to the comparators 210 corresponding to the non-subject pixel block region 302.

By using this configuration, the ramp signal Vramp[a] will not fluctuate even if the comparators 210 in the non-subject pixel block region 302 are in a non-operating state. In other words, gain fluctuations do not arise in the AD conversion in the subject pixel block region 301.

As described above, using a configuration in which different ramp signals Vramp are input to the comparators 210 in the subject pixel block region 301 and the non-subject pixel block region 302, in which different image capturing settings are applied, makes it possible to suppress a drop in image quality.

Note that the amount of a potential change of the ramp voltage Vramp, which depends on the time, corresponding to the subject pixel block region 301, may be adjusted depending on whether the comparators 210 corresponding to the non-subject pixel block region 302 are in an operating state or a non-operating state. In other words, the amount of a potential change in the ramp voltage Vramp corresponding to the subject pixel block region 301 may be adjusted by the ramp voltage generating circuit 110 so as to be the same when the comparators 210 corresponding to the non-subject pixel block region 302 are in an operating state and in a non-operating state. To be more specific, the amount of the potential change of the ramp signal Vramp, which depends on the time, is adjusted to be the same, in accordance with the number of pixel blocks for which the comparators 210 are in a non-operating state.

According to the present embodiment as described thus far, the drive signal input to the readout circuits 106 is switched, depending on whether the readout circuit is in an operating state or a non-operating state, for each of the subject pixel block region 301 and the non-subject pixel block region 302, for which the image capturing settings differ. This makes it possible to suppress a drop in image quality, such as a level difference within pixel blocks, an output signal difference between frames, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201158, filed on Oct. 25, 2018, which is hereby incorporated by reference herein in its entirety.

What is claimed is:

1. An image capturing apparatus comprising:
   a pixel portion in which a plurality of pixel blocks are arranged in a matrix, each pixel block including a predetermined number of pixels;
   a plurality of readout circuits arranged corresponding to the plurality of pixel blocks, wherein each of the readout circuits includes a circuit that has a comparator and carries out AD conversion; and
   at least one processor or circuit configured to function as the following units:
   a supply unit that supplies drive signals to the plurality of readout circuits;
   a setting unit that sets image capturing conditions for each of the plurality of pixel blocks; and
   a control unit that carries out control so that when the setting unit has set different image capturing conditions for a plurality of first pixel blocks and a plurality of second pixel blocks that are different from the first pixel blocks, the supply unit supplies first drive signals to the readout circuits corresponding to the first pixel blocks, and supplies second drive signals that are different from the first drive signals to the readout circuits corresponding to the second pixel blocks,
   wherein the drive signals include a ramp signal that is input to the comparator and has a potential that changes depending on the time, and
   wherein the potential of the ramp signal which changes depending on the time is changed in accordance with the number of the first pixel blocks.

2. The image capturing apparatus according to claim 1, wherein the setting unit sets a thinning rate as the image capturing conditions for each pixel block.

3. The image capturing apparatus according to claim 1, wherein the setting unit sets a number of pixels to be mixed as the image capturing conditions for each pixel block.

4. The image capturing apparatus according to claim 1, wherein the setting unit sets a framerate as the image capturing conditions for each pixel block.

5. The image capturing apparatus according to claim 1, wherein each of the readout circuits includes a current supply circuit.

6. The image capturing apparatus according to claim 5, wherein the drive signals include a bias voltage signal input to the current supply circuit.

7. A method of controlling an image capturing apparatus, the apparatus including a pixel portion in which a plurality of pixel blocks are arranged in a matrix, each pixel block including a predetermined number of pixels, a plurality of readout circuits arranged corresponding to the plurality of pixel blocks, each of the readout circuits including a circuit that has a comparator and carries out AD conversion, and a supply circuit that supplies drive signals to the plurality of readout circuits, the method comprising:
   setting image capturing conditions for each of the plurality of pixel blocks; and
   carrying out control so that when different image capturing conditions have been set for a plurality of first pixel blocks and a plurality of second pixel blocks that are different from the first pixel blocks, the supply circuit supplies first drive signals to the readout circuits corresponding to the first pixel blocks, and supplies second drive signals that are different from the first drive signals to the readout circuits corresponding to the second pixel blocks,
   wherein the drive signals include a ramp signal that is input to the comparator and has a potential that changes depending on the time, and
   wherein the potential of the ramp signal which changes depending on the time is changed in accordance with the number of the first pixel blocks.

* * * * *